No. 892,866. PATENTED JULY 7, 1908.
E. MOONEN.
ROLLER BEARING.
APPLICATION FILED MAY 8, 1907.

2 SHEETS—SHEET 1.

WITNESSES:
W. M. Avery
J. P. Davis

INVENTOR
Emile Moonen
BY
Munn & Co.
ATTORNEYS

No. 892,866. PATENTED JULY 7, 1908.
E. MOONEN.
ROLLER BEARING.
APPLICATION FILED MAY 8, 1907.
2 SHEETS—SHEET 2.
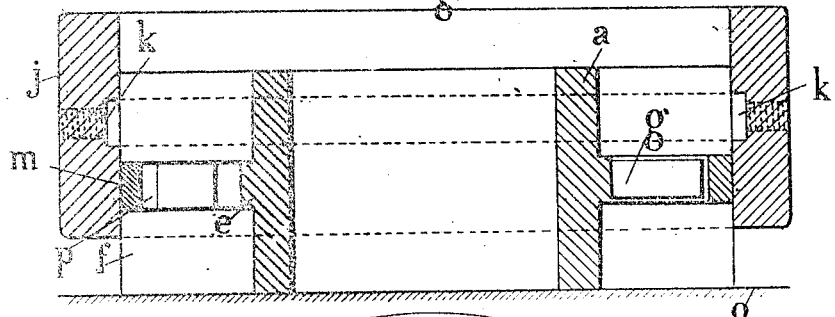
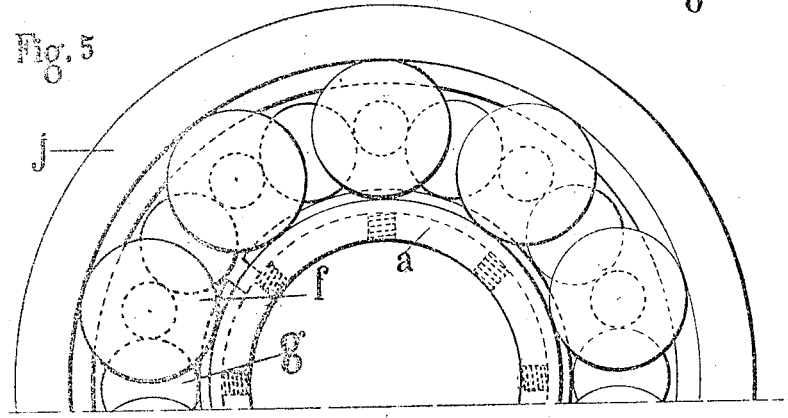
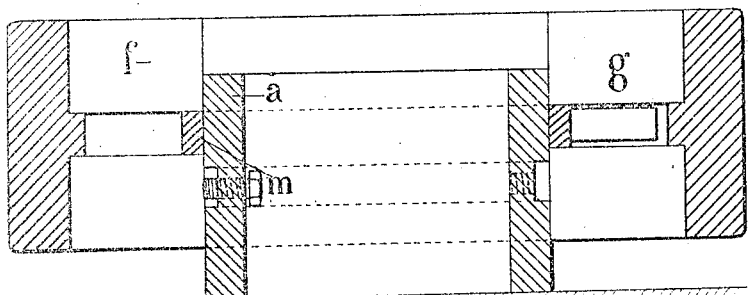
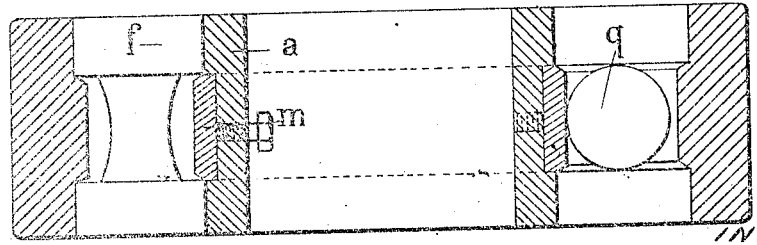
WITNESSES:
W. M. Avery
J. R. Davis
INVENTOR
Emile Moonen
BY
Munn & Co.
ATTORNEYS

UNITED STATES PATENT OFFICE.

EMILE MOONEN, OF PARIS, FRANCE.

ROLLER-BEARING.

No. 892,866.

Specification of Letters Patent.

Patented July 7, 1908.

Application filed May 8, 1907. Serial No. 372,603.

*To all whom it may concern:*

Be it known that I, EMILE MOONEN, a citizen of the French Republic, residing 69 Rue de Balagny, Paris, France, have invented certain new and useful Improvements in Roller-Bearings and Similar Antifriction Devices, of which the following is a specification.

This invention has reference to roller bearings and similar anti-friction devices, and has for its object more particularly to prevent any relative displacement of the different parts in the transverse direction, to enable the races to be made in a single piece without any joint and finally of facilitating the assemblage of such devices.

Figure 1:
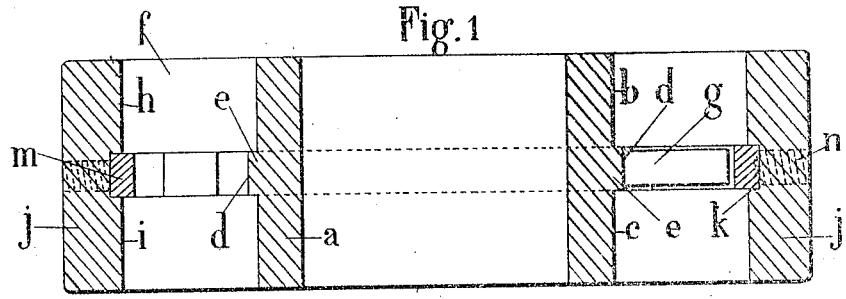
Figure 2:
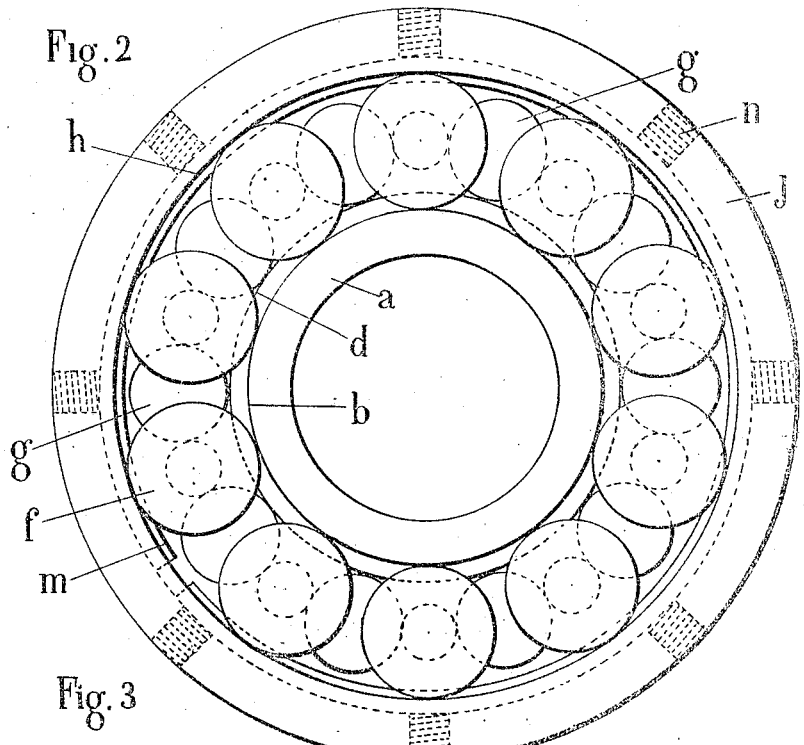
Figure 3:
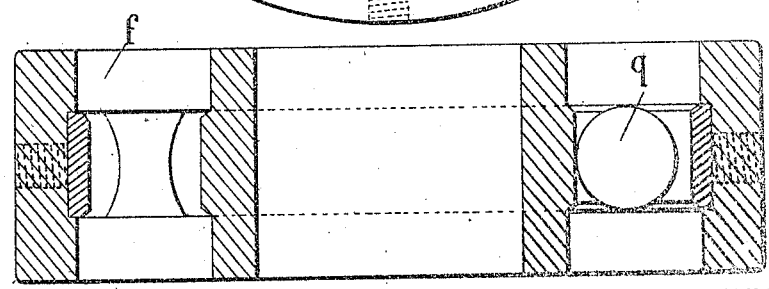

In the accompanying drawings, which illustrate some constructional forms of the object of the invention:—Figure 1 is a cross-section of a bearing of this kind with intercalary rollers. Fig. 2 is a plan view. Fig. 3 shows a bearing with intercalary balls. Fig. 4 is a cross section through the bearing during its assemblage. Fig. 5 is a partial plan view of a modified arrangement of the bearing, and Figs. 6 and 7 are sectional views illustrating two constructional forms of the bearing according to Fig. 5.

In the constructional form in accordance with Fig. 1, the bearing comprises a ring $a$, the outer contour of which presents three surfaces $b$, $c$, $d$, forming the internal race of the device. The surfaces $b$, $c$, which are in line with each other, constitute the race for the rollers $f$; the slightly projecting surface $d$ which forms part of a circular rib $e$, constitutes the race on which the intercalary rollers $g$ run. The external race is constituted by the surfaces $h$ $i$ of a ring $j$ comprising a groove or channel $k$ in which a split elastic and extensible segment $m$ is lodged; this segment also entering the channels $p$ formed in the rollers $f$ and which guide and receive the intercalary rollers $g$.

It will be seen in Fig. 1 that the rib $e$ and also the extensible segment $m$ which enters the channels $p$ in the rollers $f$ both serve to render the rings $a$ and $j$, and the various mobile parts of the device, such as the rollers and intercalary rollers, solid with each other, that is to say, to prevent the transverse displacement of these parts. The ring $j$ is provided with a number of screw-threaded holes $n$ directed radially.

This bearing is assembled in the following manner (Fig. 4):—The ring $a$ is placed flat upon a slab, table or other plane surface $o$, then the rollers $f$ and the intermediate rollers $g$ are arranged around this ring. Upon this bearing crown is then passed the extensible segment $m$ which has been previously sprung apart, and which is slid along until it comes opposite the different channels $p$ in the rollers into which it enters owing to its elasticity. From this moment the ring $a$ and mobile parts of the bearing are rendered solid one with the other in the transverse direction. The assemblage is completed by capping the bearing crown with the outer ring $j$, care being had to compress the extensible segment $m$ by any suitable means in order that it may no longer project outside the rollers $f$.

When the groove $k$ has come opposite the segment, the latter owing to its elasticity immediately enters the groove, and the ring $j$ is rendered solid with the rollers in the transverse direction.

In order to dismount the bearing, screw-threaded rods, preferably ending in points, are screwed into some of the holes $n$ in the ring $j$ in order to press the segment inwards or tighten it until it is entirely released from the channel $k$. The ring $j$ may then be withdrawn as represented in Fig. 4. The segment $m$ and the different rollers may now readily be removed in their turn.

In the constructional form shown in Fig. 3, the intermediate rollers are replaced by intermediate balls $g$. The method of assemblage and dismounting remains the same.

In the constructional form shown in Figs. 5 6 and 7, the arrangement is reversed, that is to say, the projecting rib $e$ is formed on the external race, while the extensible ring $m$ enters an appropriate groove in the inner race; these two figures illustrating the application of this modified construction to a bearing with intercalary rollers in Fig. 6, and with intercalary balls in Fig. 7.

The advantages are as follows:—This form of bearing insures the immobility of the several parts in the transverse direction, and thereby enables all lateral stops to be dispensed with. The assemblage of roller bearings is considerably facilitated owing to the fact that the split extensible segment, whether it be applied to the inner or to the outer race, appropriately maintains the movable elements, such as rollers or balls, which have a tendency to become disarranged, in a temporary position which permits of any subsequent manipulation for completing the assemblage. Further, it is possible to form the race in one piece without any joint.

The invention is applicable to roller bearings and to any type of bearing of this nature.

Having now particularly described and ascertained the nature of my said invention and in what manner the same is to be performed, I declare that what I claim is:

1. In a roller bearing, the combination of two bearing-rings, each in one piece, one of which is provided with a circular rib and the other with a circular channel, an extensible segment lodged in said channel forming a rib on the ring, rollers having grooves engaging with the circular rib and with the segment, the channel ring being provided with holes for permitting access to the segment to compress the same, whereby the bearing can be assembled and dismounted by sliding one bearing-ring along the rollers carried by the other bearing-ring.

2. In a roller bearing, the combination of two integral bearing-rings, one of which is provided with a circular rib, and the other with a circular channel, an extensible segment lodged in said channel forming a rib on the ring, rollers having grooves engaging with the circular rib and with the segment, intermediate rolling members received in the grooves of the rollers, said channeled ring being provided with holes for permitting access to the segment whereby to compress the same when mounting or dismounting the bearings 3. In a roller bearing, the combination of two bearing-rings, one of which is provided with a circular rib, and the other with a circular channel, a split extensible segment lodged in said channel forming a rib on the ring, said channeled ring having a number of screw-threaded holes formed therein to permit of compressing the extensible segment, and rollers having grooves engaging with the circular rib and with the segment.

4. In a roller bearing the combination of two bearing rings, one of which is provided with a circular rib, and the other with a circular channel, a split extensible segment lodged in said channel forming a rib on the ring, said channeled ring having a number of screw-threaded holes formed therein to permit of compressing the extensible segment, rollers having grooves engaging with the circular rib and with the segment, and intermediate rolling members received in the grooves of the rollers.

In testimony whereof I have hereunto placed my hand this 26th day of April 1907.

EMILE MOONEN.

In the presence of two witnesses:
ALBERT NUNÈS,
H. C. COXE.